(12) United States Patent
Kakutani

(10) Patent No.: US 10,005,289 B2
(45) Date of Patent: Jun. 26, 2018

(54) PRINTING APPARATUS, PRINTING METHOD, AND NON-TRANSITORY COMPUTER READABLE MEDIUM FOR STORING PROGRAM

(71) Applicant: SEIKO EPSON CORPORATION, Tokyo (JP)

(72) Inventor: Toshiaki Kakutani, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days. days.

(21) Appl. No.: 15/695,439

(22) Filed: Sep. 5, 2017

(65) Prior Publication Data

US 2018/0079220 A1 Mar. 22, 2018

(30) Foreign Application Priority Data

Sep. 16, 2016 (JP) ................. 2016-181208

(51) Int. Cl.
*B41J 2/045* (2006.01)
*B41J 2/21* (2006.01)
*H04N 1/40* (2006.01)

(52) U.S. Cl.
CPC ......... *B41J 2/2103* (2013.01); *B41J 2/04508* (2013.01); *B41J 2/04586* (2013.01); *H04N 1/40087* (2013.01)

(58) Field of Classification Search
CPC .. B41J 2/2103; B41J 2/04586; B41J 2/04508; B41J 2/2056; B41J 2/2132; H04N 1/40087; H04N 1/405; H04N 1/605
See application file for complete search history.

(56) References Cited

U.S. PATENT DOCUMENTS

| 8,353,569 B2 * | 1/2013 | Takahashi | B41J 2/2056 347/14 |
| 8,517,494 B2 | 8/2013 | Kakutani | |
| 8,730,520 B2 | 5/2014 | Konno et al. | |
| 9,144,995 B2 * | 9/2015 | Mizuno | B41J 2/21 |
| 9,440,436 B2 * | 9/2016 | Kato | B41J 2/2107 |

FOREIGN PATENT DOCUMENTS

| JP | 5539119 B2 | 7/2014 |
| JP | 5633110 B2 | 12/2014 |

\* cited by examiner

*Primary Examiner* — Thinh H Nguyen

(57) ABSTRACT

A printing apparatus has a plurality of nozzles capable of discharging dark ink and light ink that are of the same type color; the plurality of nozzles includes preceding nozzles that discharge the ink onto the printing medium before the ink discharge of the other nozzles, and succeeding nozzles that discharge the ink onto the printing medium after the ink discharge of the preceding nozzles, and if the amount of the dark ink discharged on the printing target region is larger than a predetermined amount, the printing apparatus discharges a smaller amount of the light ink than the amount of the discharged dark ink onto the printing target region from the plurality of nozzles so that the amount of the light ink discharged from the succeeding nozzles is larger than the amount of the light ink discharged from the preceding nozzles.

4 Claims, 9 Drawing Sheets

| INK DUTY | PASS 3 (SUCCEEDING PASS) | PASS 2 | PASS 1 (PRECEDING PASS) |
|---|---|---|---|
| 100% | 50% | 100% | 50% |
| 40% | 20% | 40% | 20% |
| 16% | 16% | 16% | 0% |
| 5% | 10% | 0% | 0% |

FIG. 9

| | |
|---|---|
| 0 | 9 |
| 5 | 5 |
| 1 | 10 |
| 6 | 6 |
| 2 | 11 |
| 7 | 7 |
| 3 | 12 |
| 8 | 8 |
| 4 | 13 |
| 0 | 9 |
| 5 | 5 |
| 1 | 10 |
| 6 | 6 |
| 2 | 11 |
| 7 | 7 |
| 3 | 12 |
| 8 | 8 |
| 4 | 13 |
| 9 | 0 |
| 5 | 5 |
| 10 | 1 |
| 6 | 6 |
| 11 | 2 |
| 7 | 7 |
| 12 | 3 |
| 8 | 8 |
| 13 | 4 |
| 9 | 0 |
| 5 | 5 |
| 10 | 1 |
| 6 | 6 |
| 11 | 2 |
| 7 | 7 |
| 12 | 3 |
| 8 | 8 |
| 13 | 4 |

FIG. 10

PRINTING APPARATUS, PRINTING METHOD, AND NON-TRANSITORY COMPUTER READABLE MEDIUM FOR STORING PROGRAM

BACKGROUND

1. Technical Field

The present invention relates to a printing apparatus, a printing method, and a non-transitory computer readable medium for storing program.

2. Related Art

Traditionally, in a serial printing apparatus, a print head scans a common region on a printing medium multiple times and forms ink dots, thereby printing an image. Regarding serial printing apparatuses of this type, printing apparatuses that use pigment ink containing pigments as color materials have increased in number. As a problem with the serial printing apparatuses that use pigment ink, bronzing in which a printed surface appears to have a bronze color when the surface is viewed from a certain angle is known, as described in Japan Patent No. 5539119.

In general, in order to obtain high-gloss output with pigment ink, ink containing not only a pigment composition but also a resin composition is used. As the amount of the resin composition is increased, high-gloss output is more easily achieved. The amount of the resin composition contained in the ink, however, is limited, and it is difficult to create ink sufficiently containing both resin composition and pigment composition. Thus, when high-density printing is executed with dark ink (for example, black ink) containing a large amount of a pigment composition and a relatively small amount of a resin composition, a gloss level is reduced and the density of output color ink appears to be reduced due to the diffused reflection of light. Specifically, when a certain amount or more of dark ink is printed in the same printing region, the visual density does not sufficiently increase and an effect in which the density appears to be reduced occurs. When an image is formed by executing multiple scans and discharging ink, and the number of scans or a time interval between scans is reduced for faster printing, this effect may easily occur.

This effect may be recognized as gloss unevenness when a whole printed image is viewed. Such gloss unevenness is noticeable for a printer that causes time intervals between main scans to vary depending on regions to be printed, like a serial printer that forms an image by executing multiple main scans. In addition, such gloss unevenness is especially noticeable in a printing mode that is a bidirectional printing mode or the like and in which a time difference relationship is reversed for each sub-scan at both ends in a main scan direction. The invention aims to suppress gloss unevenness that occurs when the amount of a pigment composition per unit area is relatively large. The invention also aims to solve an effect that has been tried to be solved by Japanese Patent No. 5539119 and is completely different from bronzing that occurs even if the amount of a pigment composition is relatively small.

SUMMARY

An advantage of some aspects of the invention is that it solves at least a part of the aforementioned problems, and the invention can be achieved as the following aspects.

(1) According to an aspect of the invention, a printing apparatus is provided. The printing apparatus includes a print head that has a plurality of nozzles capable of discharging dark ink and light ink that are of the same color type and is driven relative to a printing medium in a main scan direction that is a width direction of the printing medium and in a sub-scan direction intersecting the main scan direction, an acquiring section that acquires image data, and a dot forming section that forms dots based on the image data on the printing medium by causing the print head to discharge the ink onto the printing medium while causing the print head to scan a common printing region in the main scan direction multiple times; the plurality of nozzles include preceding nozzles that discharge the ink onto the printing medium before the ink discharge of the other nozzles, and succeeding nozzles that discharge the ink onto the printing medium after the ink discharge of the preceding nozzles; the dot forming section controls a usage rate of at least any of nozzles included in the preceding nozzles and nozzles included in the succeeding nozzles and controls the amount of at least the light ink to be discharged onto a printing target region in a preceding pass in which a scan is executed in the main scan direction while dots are formed using the preceding nozzles and a succeeding pass in which a scan is executed in the main scan direction while dots are formed using the succeeding nozzles; and if the amount of the dark ink discharged on the printing target region is larger than a predetermined amount, the dot forming section causes the print head to discharge a smaller amount of the light ink than the amount of the discharged dark ink onto the printing target region from the plurality of nozzles so that the amount of the light ink discharged from the succeeding nozzles is larger than the amount of the light ink discharged from the preceding nozzles. According to the printing apparatus according to the aspect, if a dark color is output using the dark ink containing a small amount of a resin composition, the light ink containing a large amount of a resin composition can be discharged mainly from the succeeding nozzles, and a large amount of the resin composition can remain on the surface of the printing medium. Thus, the occurrence of gloss unevenness can be suppressed.

(2) In the printing apparatus according to the aspect, the dot forming section may determine the formation of dots by comparing a plurality of thresholds included in a dither mask with pixel data forming the image data; and in the dither mask, thresholds corresponding to positions at which dots are formed by the succeeding nozzles that discharge the light ink may be set to values that cause dots to be more easily formed than thresholds corresponding to positions at which dots are formed by the succeeding nozzles that discharge the light ink. According to the printing apparatus according to the aspect, a halftone process and the determination of usage rates of the nozzles can be executed by only using the dither mask. Thus, the speed of a printing process can be increased.

Various aspects of the invention can be achieved. For example, according to other aspects of the invention, a printing method and a computer program are provided. The computer program may be recorded in a computer-readable recording medium.

BRIEF DESCRIPTION OF THE DRAWINGS

The invention will be described with reference to the accompanying drawings, wherein like numbers reference like elements.

FIG. 9 is a diagram showing an overlapping nozzle map.

FIG. 10 is a diagram showing an overlapping nozzle map.

DESCRIPTION OF EXEMPLARY EMBODIMENTS

A. First Embodiment

Figure 1:
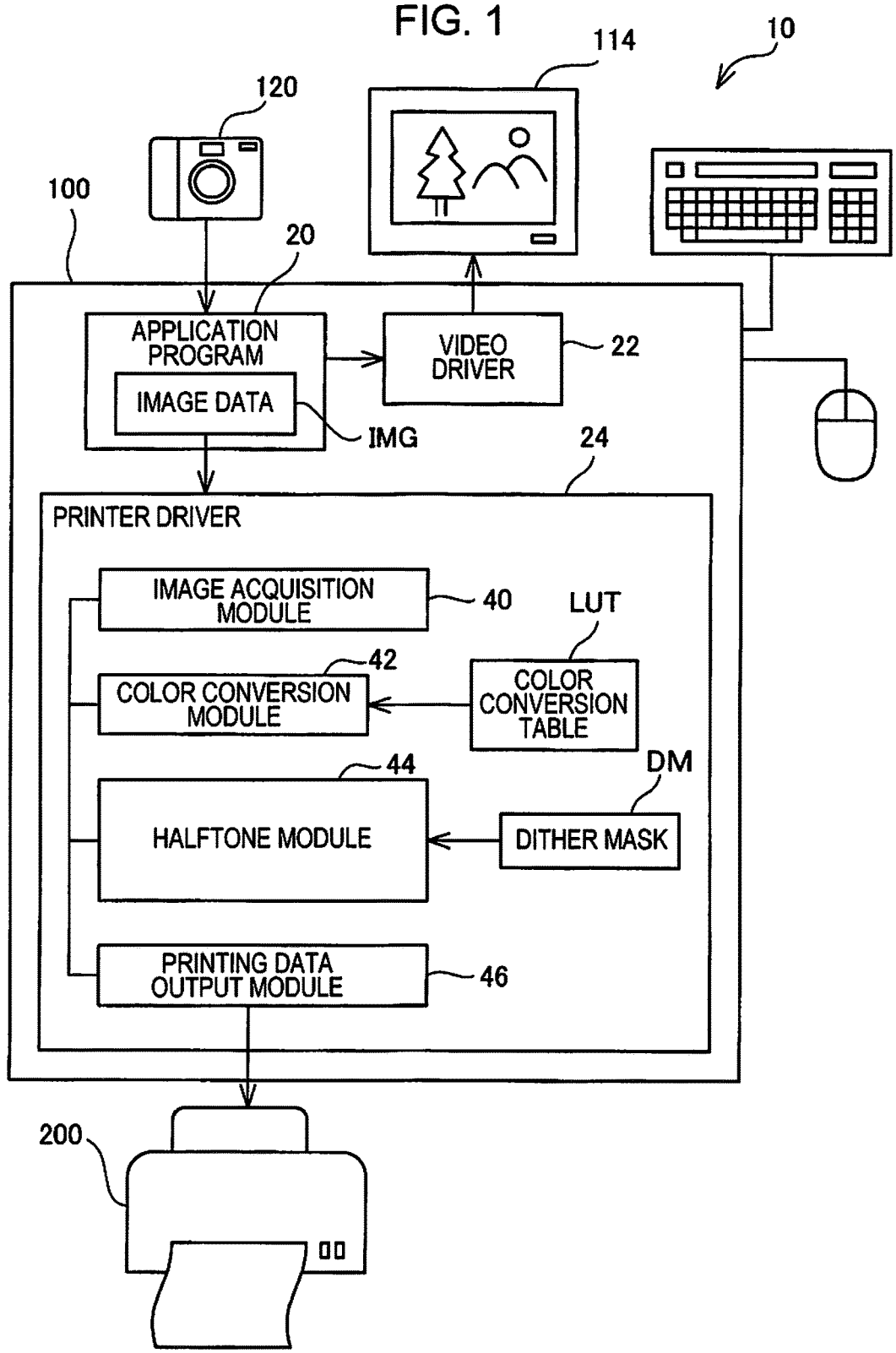
FIG. 1 is a diagram showing a schematic configuration of a printing system.

FIG. 1 is a diagram showing a schematic configuration of a printing system 10 according to a first embodiment of the invention. As shown in FIG. 1, the printing system 10 according to the first embodiment includes a computer 100 and a printer 200 configured to actually print an image under control of the computer 100. The printing system 10 as a whole functions as a printing apparatus in a broad sense.

In the computer 100 shown in FIG. 1, a predetermined operating system is installed and an application program 20 is executed under the operating system. A video driver 22 and a printer driver 24 are included in the operating system. The application program 20 receives image data IMG from a digital camera 120 via a peripheral device interface or the like, for example. Then, the application program 20 causes a display 114 to display an image represented by the image data IMG via the video driver 22. In addition, the video program 20 outputs the image data IMG to the printer 200 via the printer driver 24. The image data IMG received by the application program 20 from the digital camera 120 is color data of three color compositions of red (R), green (G), and blue (B) or is monochrome data of a single color composition.

The printer driver 24 corresponds to a "dot forming section" in the present application and achieves a "dot formation function". The printer driver 24 includes an image acquisition module 40, a color conversion module 42, a halftone module 44, and a printing data output module 46. The image acquisition module 40 corresponds to an "acquiring section" in the present application and achieves an "acquisition function". The image acquisition module 40 acquires, from the application program 20, the image data to be printed.

The color conversion module 42 references a color conversion table LUT prepared in advance and converts the color compositions R, G, and B of the image data to color compositions (cyan (C), light cyan (Lc), magenta (M), light magenta (Lm), yellow (Y), black (K), and gray (Lk)) that can be reproduced by the printer 200. If the image data is monochrome data, the color conversion module 42 converts the image data to two dark and light color compositions of achromatic colors, black (K) and gray (Lk). The first embodiment assumes that the input image data is the monochrome data.

The halftone module 44 executes a halftone process of reproducing the image data after the color conversion using a distribution of dots. Specifically, the halftone module 44 executes the halftone process using a dither mask DM.

The printing data output module 46 sorts data obtained by the halftone process and indicating the arrangement of the dots of colors in the order in which the dots are formed by the print head 241 of the printer 200, and outputs the data as printing data to the printer 200.

In the first embodiment, usage rates of the nozzles included in the print head 241 described later are set based on the colors of the image data. If dark ink is discharged with a high ink duty, a small amount of light ink is used together with the dark ink. In this case, the light ink is discharged mainly in a succeeding pass among multiple main scan passes in which the same region is scanned. The ink duty indicates a dot recording rate in a predetermined printing region. The printing system 10 prints light ink containing a large amount of a resin composition effective to improve gloss mainly in a succeeding pass and efficiently suppresses gloss unevenness by using a small amount of the light ink so that the resin composition can easily remain on a surface of a printing material. The principle of printing the light ink afterward is described later in detail.

The "dark ink" and the "light ink" are of the same color type and are different in density from each other. If the "dark ink" and the "light ink" are discharged onto a printing medium, ink with a relatively high density is the "dark ink" and ink with a relatively low density is the "light ink". In the first embodiment, black (K) ink is the "dark ink" and gray (Lk) ink is the "light ink".

Figure 2:
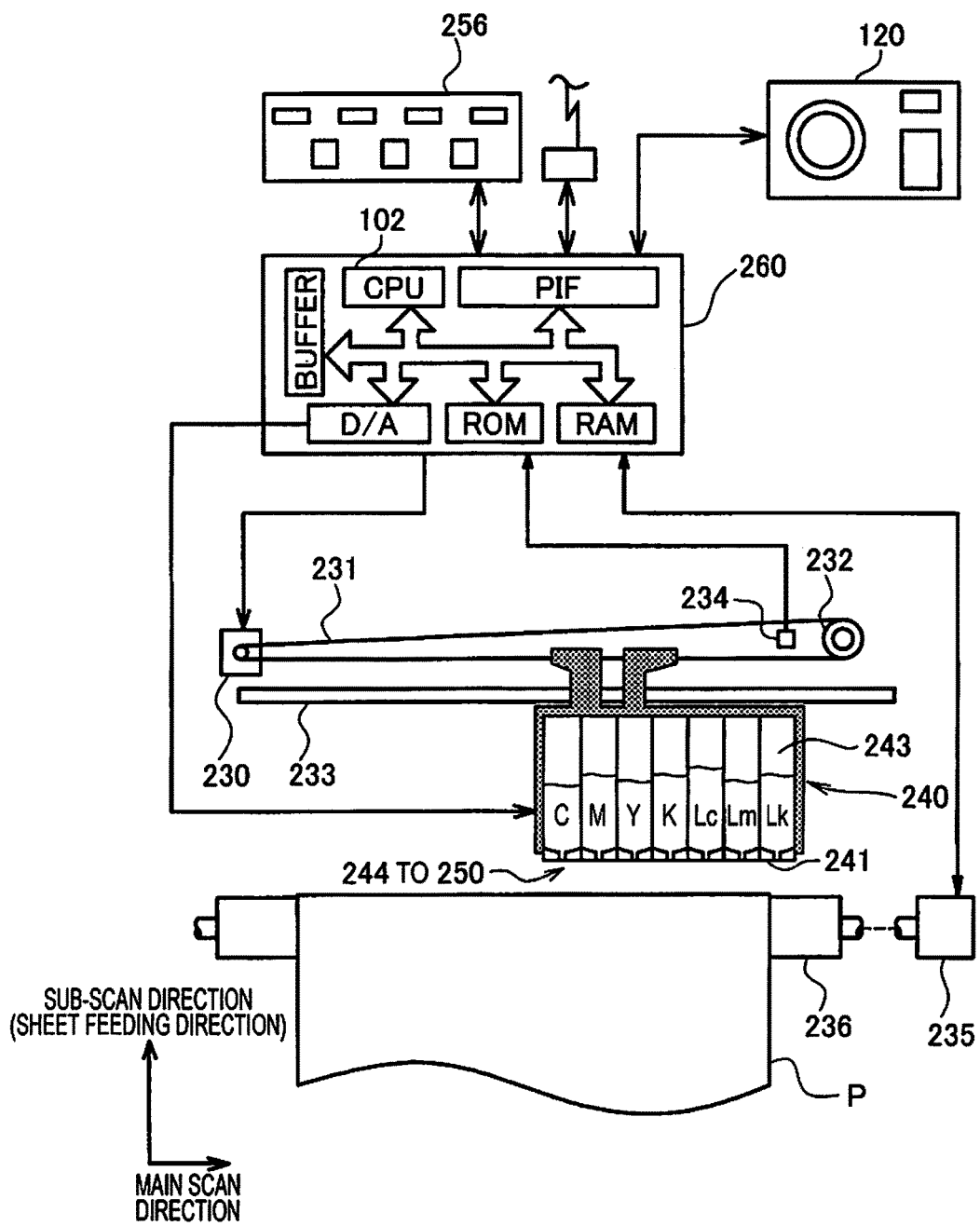
FIG. 2 is a diagram showing a schematic configuration of a printer.

FIG. 2 is a diagram showing a schematic configuration of the printer 200. The printer 200 is a so-called serial printer and includes a transporting mechanism for transporting a printing medium P with a sheet feeding motor 235 in a sub-scan direction; a main scan mechanism for transporting a carriage 240 with a carriage motor 230 multiple times in an axial direction of a platen 236 or a main scan direction that is a width direction of the printing medium P; a mechanism for driving the print head 241 mounted on the carriage 240 to cause the print head 241 to discharge ink and form dots; and a control circuit 260 that controls the transmission and reception of signals between the sheet feeding motor 235, the carriage motor 230, the print head 241, and an operation panel 256. As the printing medium P, a glossy medium with a surface coated with synthetic resin may be used, for example.

The main scanning mechanism that causes the carriage 240 to reciprocate in the axial direction of the platen 236 includes a sliding shaft 233 extending along the axis of the platen 236 and holding the carriage 240 so that the carriage 240 is slidable; a pulley 232 supporting an endless driving belt 231 stretched between the pulley 232 and the carriage motor 230; and a position detection sensor 234 that detects the position of the origin of the carriage 240.

Multiple ink cartridges 243 storing cyan (C) ink, magenta (M) ink, yellow (Y) ink, black (K) ink, light cyan (Lc) ink, light magenta (Lm) ink, and gray (Lk) ink are attached to the carriage 240. In the first embodiment, color materials of the ink are pigments. The ink contains not only pigment compositions but also resin compositions for improving gloss. The amounts of pigment compositions that can be contained in the ink and the amounts of resin compositions that can be contained in the ink, however, are limited. Since the dark (K, C, and M) ink contains large amounts of pigment compositions, the amounts of resin compositions that can be contained in the dark ink are small. Thus, the dark ink contains relatively small amounts of resin compositions. The light (Lk, Lc, and Lm) ink can contain larger amounts of resin compositions than the amounts of the resin compositions contained in the dark ink. Each of nozzle strings 244 to 250 that discharge ink is formed for a respective color on the print head 241 mounted on a lower portion of the carriage 240.

Figure 3:
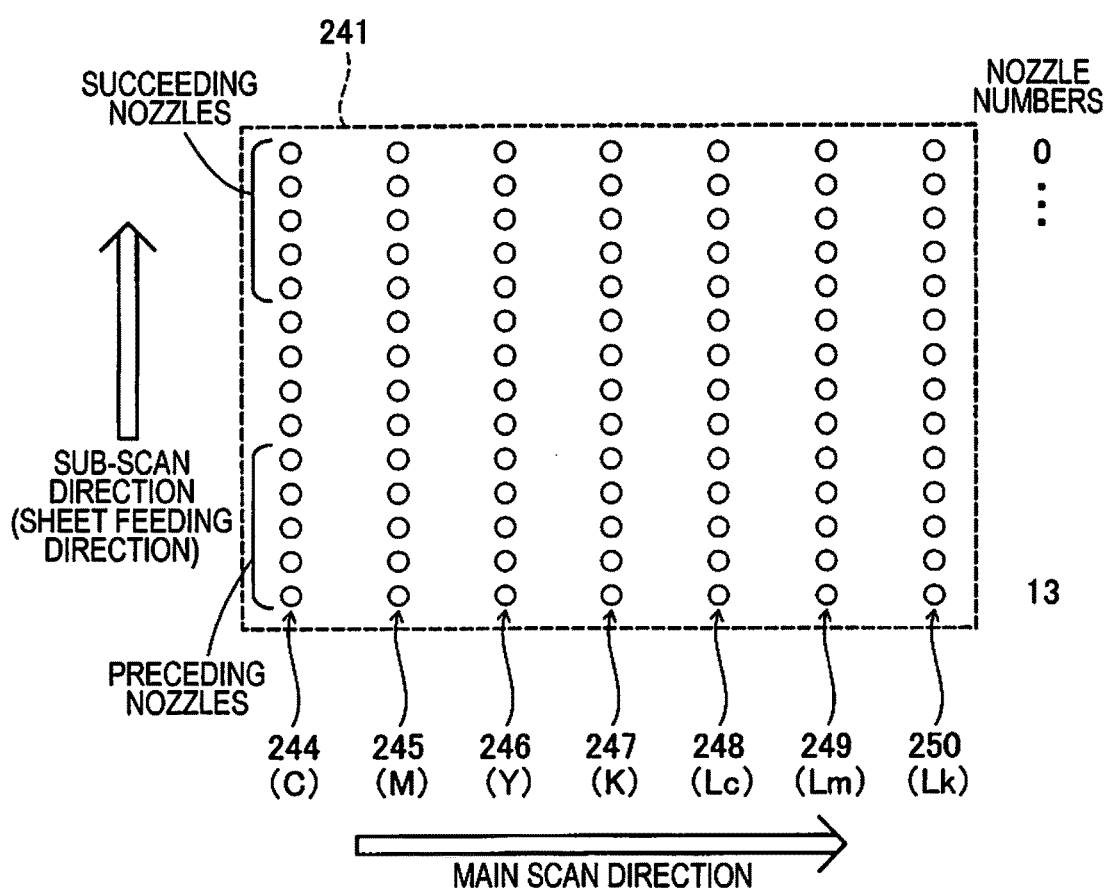
FIG. 3 is a diagram showing the arrangement of nozzle strings formed on a bottom surface of a print head when viewed from the side of a carriage.

FIG. 3 is a diagram showing the arrangement of the nozzle strings formed on a bottom surface of the print head 241 when viewed from the side of the carriage 240. As shown in FIG. 3, the print head 241 includes the nozzle strings 244 to 250, each of which has multiple nozzles arranged side by side in the sub-scan direction intersecting the main scan direction. In the first embodiment, each of the nozzle strings has 14 nozzles. The ink is supplied to the nozzle strings 244 to 250 from the ink cartridges 243 attached to the carriage 240, and the nozzle strings 244 to 250 can discharge the cyan (C) ink, the magenta (M) ink, the yellow (Y) ink, the black (K) ink, the light cyan (Lc) ink, the light magenta (Lm) ink, and the gray (Lk) ink. In the following description, nozzle numbers of nozzles located on the front end side with respect to the sub-scan direction are "13", and nozzle numbers of nozzles located on the rear end side with respect to the sub-scan direction are "0". As shown in FIG. 3, in the first embodiment, nozzles included in each of the nozzle strings corresponding to the ink colors are arranged side by side in a single column in the sub-scan direction. The arrangement of nozzles included in each of the nozzle strings, however, is not limited. For example, nozzles for each color may be arranged in multiple columns or arranged in a zigzag pattern.

As shown in FIG. 2, the control circuit 260 included in the printer 200 includes a CPU 102, a ROM, a RAM, and a peripheral device interface (PIF) that are connected to each other via a bus. When receiving the printing data output from the computer 100 via the PIF, the control circuit 260 drives the carriage motor 230 to cause the print head 241 to reciprocate toward and away from the printing medium P multiple times in the main scan direction and drives the sheet feeding motor 235 to move the printing medium P in the sub-scan direction. The control circuit 260 drives the nozzles at appropriate time based on the printing data in coordination with the reciprocation movement (main scan) of the carriage 240 and the movement (sub-scan) of the printing medium by sheet feeding, thereby causing the nozzles to form ink dots of appropriate colors at appropriate positions on the printing medium P. By executing this operation, the printer 200 can print a color image on the printing medium P. In the first embodiment, the printing medium is transported in the sub-scan direction. In the first embodiment, however, the position of the printing medium may be fixed and the carriage 240 may be transported in the sub-scan direction. Specifically, the print head 241 may be driven relative to the printing medium P in the main scan direction and the sub-scan direction.

In the first embodiment, in the driving and control of the print head 241, the number of nozzles for each color is 14, each nozzle pitch is 2, and a sheet feeding amount is 9. In the first embodiment, bidirectional printing is executed to discharge the ink upon both forward and backward movements of the print head 241. Each nozzle pitch is a gap between two nozzles formed in a nozzle string. In the first embodiment, since each nozzle pitch is "2", dots are formed for every other line in a single main scan of the print head 241. If a region for 9 lines corresponding to the sheet feeding amount that is the amount of sheet feeding executed one time is paid attention, dots are formed by 5 nozzles located on the front end side and having nozzle numbers 9 to 13 in every other line in a first main scan pass or a preceding pass, dots are formed by 4 nozzles having nozzle numbers 5 to 8 in lines located between the lines of the first main scan pass in a second main scan pass, and nozzles located on the rear end side and having nozzle numbers 0 to 4 scan the same lines as the lines of the first main scan pass while overlapping the same lines as the lines of the first main scan pass in a third main scan pass or a succeeding pass.

As described above, the printing system 10 according to the first embodiment includes a function of suppressing gloss unevenness. In order to achieve the function, the printing system 10 controls usage rates of the nozzles so that usage rates of nozzles that are among nozzles included in nozzle strings for discharging light ink and are located on the rear end side with respect to the sub-scan direction are higher than usage rates of nozzles that are among the nozzles included in the nozzle strings for discharging light ink and are located on the front end side with respect to the sub-scan direction. Hereinafter, the nozzles, located on the rear end side, with usage rates to be increased are referred to as "succeeding nozzles", while the nozzles, located on the front end side, with usage rates to be relatively reduced are referred to as "preceding nozzles". Specifically, if the same region is completed by multiple main scan passes, nozzles to be used for a preceding pass are preceding nozzles, and nozzles to be used for a succeeding pass are succeeding nozzles. If the number of scans is odd, nozzles to be used for a middle pass may not belong to the preceding and succeeding passes. Since the preceding nozzles are used for a main scan pass to be carried out before scan passes to be carried out with the other nozzles including the succeeding nozzles, the preceding nozzles discharge the ink before the ink discharge of the other nozzles (in other words, the succeeding nozzles discharge the ink after the ink discharge of the preceding nozzles). In the first embodiment, the number of the nozzles with usage rates to be increased is equal to the number of nozzles included in a region corresponding to the sheet feeding amount by which the print head 241 is moved in the sub-scan direction in a single sub-scan (the number of nozzles with usage rates to be increased is S in the first embodiment). As shown in FIG. 3, in the first embodiment, the succeeding nozzles have the nozzle numbers 0 to 4, and the preceding nozzles have the nozzle numbers 9 to 13.

Figure 4:
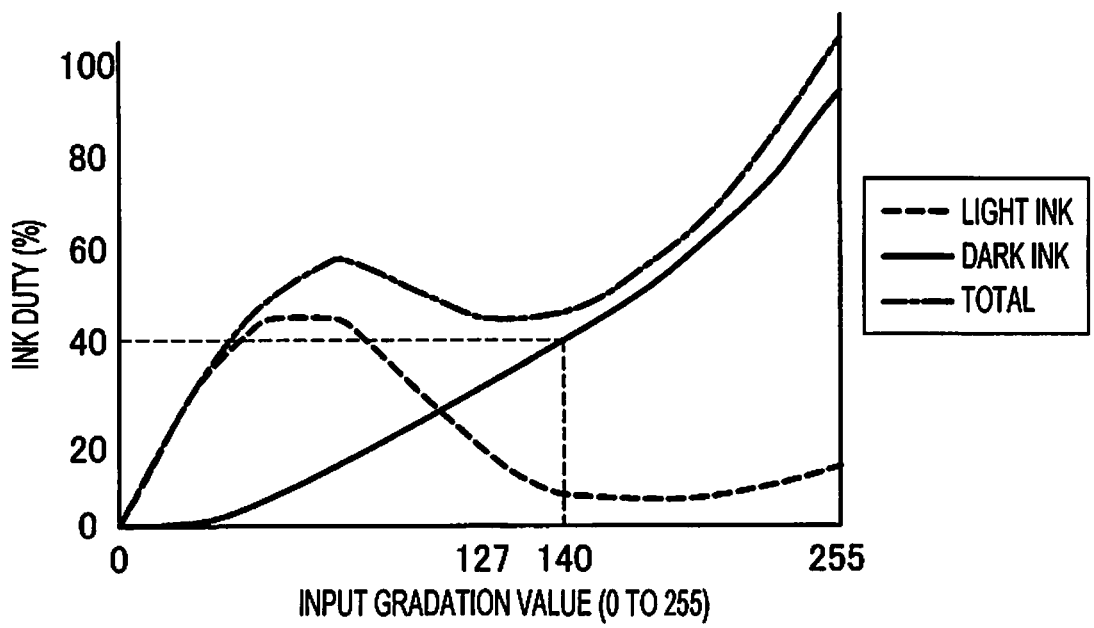
FIG. 4 is a diagram showing ink duties of dark and light ink with respect to an input gradation value.

FIG. 4 is a diagram showing ink duties of the dark and light ink or black (K) ink and gray (Lk) ink with respect to an input gradation value upon printing of monochrome image data. In FIG. 4, the ordinate indicates the ink duties and the abscissa indicates the input gradation value. In FIG. 4, the input gradation value is in a range of 0 to 255. As the input gradation value is increased (or becomes closer to 255), the density of an image corresponding to the input gradation value is increased. As the input gradation value is reduced (or becomes closer to 0), the density of the image corresponding to the input gradation value is reduced. FIG. 4 shows the ink duty of the light ink and the ink duty of the dark ink.

As shown in FIG. 4, in the first embodiment, as the input gradation value is increased, the ink duty of the dark ink is increased. On the other hand, the ink duty of the light ink is the maximum value when the input gradation value is approximately 63. As the input gradation value is increased from approximately 63, the ink duty of the light ink is gradually reduced. When the input gradation value is a certain value (approximately 140 in the first embodiment), the ink duty of the dark ink is equal to a predetermined value (approximately 40% in the first embodiment). As the input gradation value is increased from the certain value to 255, the ink duty of the light ink is slightly increased. In general, if the ink duty of the dark ink is sufficiently high, the light ink does not need to be used together with the dark ink. In the first embodiment, however, if the amount of the dark ink discharged on a printing target region is larger than a predetermined amount, an appropriate amount of the light ink that is smaller than the amount of the discharged dark ink is discharged onto the printing target region. FIG. 4 shows an example in which if the input gradation value is larger than 0, the ink duty of the light ink is not 0. For example, the ink duty of the light ink may be set so that the ink duty of the light ink is 0 when the input gradation value is a predetermined value (approximately 140, for example) and that the ink duty of the light ink is gradually increased as the input gradation value is increased from the predetermined value to the maximum value.

Figure 5:
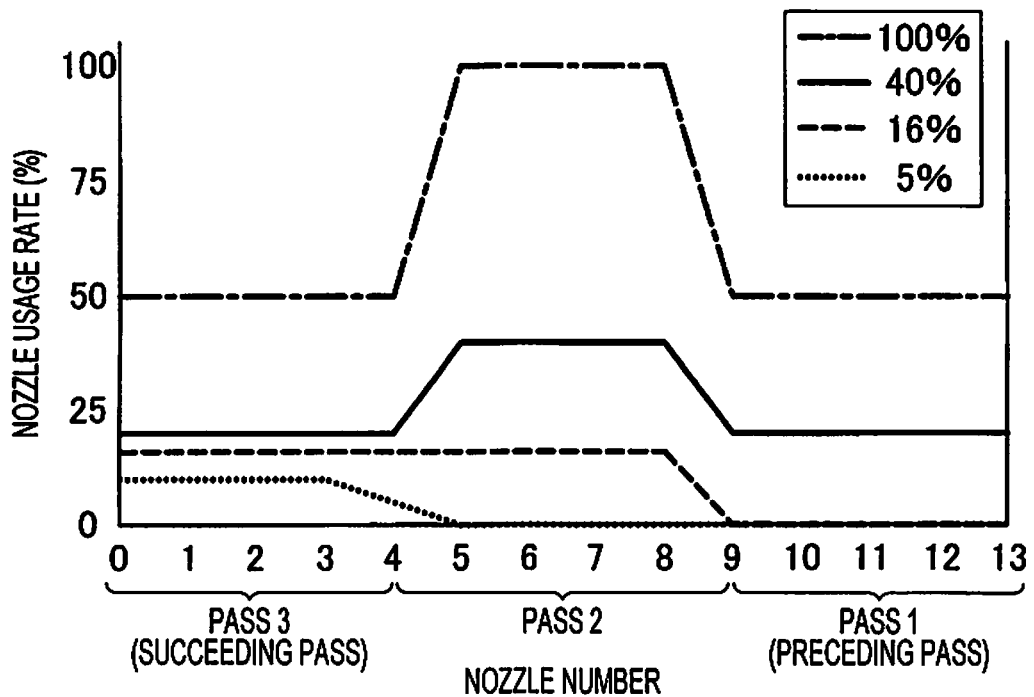
FIG. 5 is a diagram showing design values of nozzle usage rates of nozzles included in nozzle strings for light ink.

FIG. 5 is a diagram showing design values of nozzle usage rates of the nozzles included in the nozzle strings for light (Lk) ink according to the first embodiment. Since the design values are expected values upon the design and vary for nozzle numbers, it is sufficient if the design values tend to be values shown in FIG. 5. In FIG. 5, the ordinate indicates a nozzle usage rate and the abscissa indicates a nozzle number. A nozzle usage rate of a certain nozzle indicates a probability at which a dot is formed by the certain nozzle. FIG. 5 shows the nozzle usage rates in cases where the ink duty is 100%, 40%, 16%, and 5%. If the ink duty is between two of those percentages, values calculated by linear interpolation from ink duty values shown in FIG. 5 are used for the nozzle numbers. If the ink duty is 5%, the succeeding nozzles having the nozzle numbers 0 to 4 are used to discharge the ink. If the ink duty is 16%, the nozzles having the nozzle numbers 0 to 8 and including the succeeding nozzles are used to discharge the ink. In the case where the light ink is discharged as shown in FIG. 5, a small amount of the light ink (refer to FIG. 4) can be discharged mainly by the succeeding nozzles, like the discharge of the light ink in the case where the input gradation value is in a range of 140 to 255. In the cases where the ink duty is 40% and 100%, the preceding nozzles and the succeeding nozzles are overlapped above the same raster, the nozzle usage rates of the nozzles are set to half of the nozzle usage rates when the preceding and succeeding nozzles are not overlapped, and the preceding nozzles and the succeeding nozzles are used at the same rate. Thus, an effect on banding caused by an error of sheet feeding in each cycle of the sheet feeding is reduced by half, and the occurrence of the banding can be suppressed. In the cases where the ink duty is 16% and 5%, the effect is eliminated. The banding noticeably occurs when the ink duty is middle or high. Thus, when the ink duty is such a low value, a large problem does not occur.

Figures 6, 7:
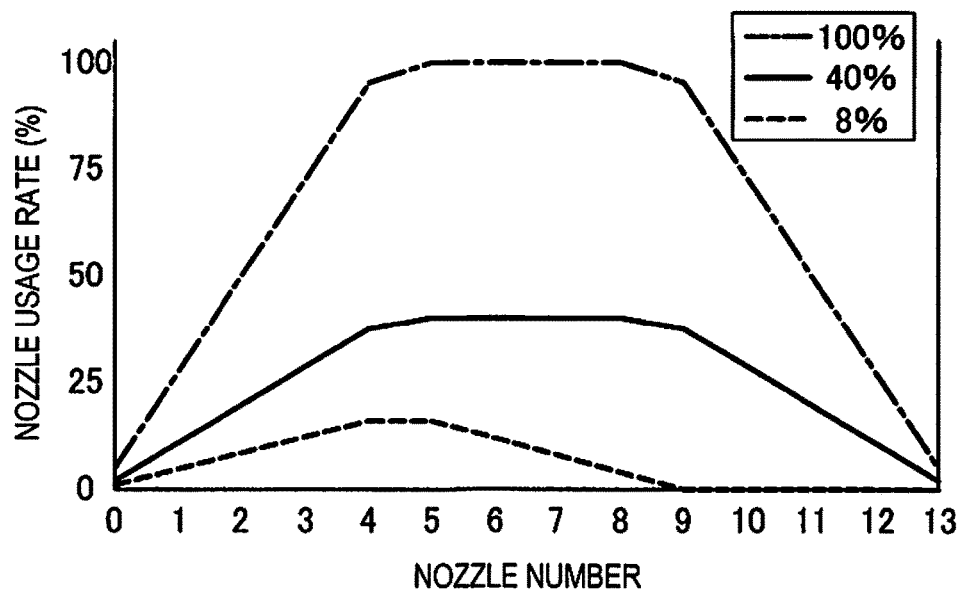
FIG. 6 is a diagram showing design values of the nozzle usage rates of the nozzles included in the nozzle strings for light ink.
FIG. 7 is a diagram showing nozzle usage rates in passes shown in FIG. 5.

In FIG. 5, nozzle usage rates of nozzles used for the same pass are the same, except the nozzle number 4. On the other hand, as shown in FIG. 6, the nozzles may be designed so that the nozzle usage rates of the nozzles vary for the nozzle numbers. If the light ink is discharged as shown in FIG. 6, the ink discharge efficiently suppresses the banding.

FIG. 7 is a diagram showing the nozzle usage rates in passes shown in FIG. 5. In the first embodiment, the nozzle usage rates in the passes are changed based on the ink duty. FIG. 7 shows only values in the cases where the ink duty is 100%, 40%, 16%, and 5%. If the ink duty is between two of those percentages, values calculated by the linear interpolation are used. For example, the nozzle usage rates in pass 3 when the ink duty is 25% can be calculated to be 17.5% according to the following formula from a value of 20 when the ink duty is 40% and a value of 16 when the ink duty is 16%.

$$20*(25-16)/(40-16)+16*(40-25)/(40-16)$$

As shown in FIG. 7, if the ink duty is equal to or lower than 5% or the amount of the ink to be discharged is small, the formation of all dots is completed in the third pass that is a succeeding pass. Although FIG. 7 shows an example in which the nozzle usage rates of the nozzles are changed at four levels based on the ink duty, the nozzle usage rates may be changed at a larger number of levels or a smaller number of levels.

Figure 8:
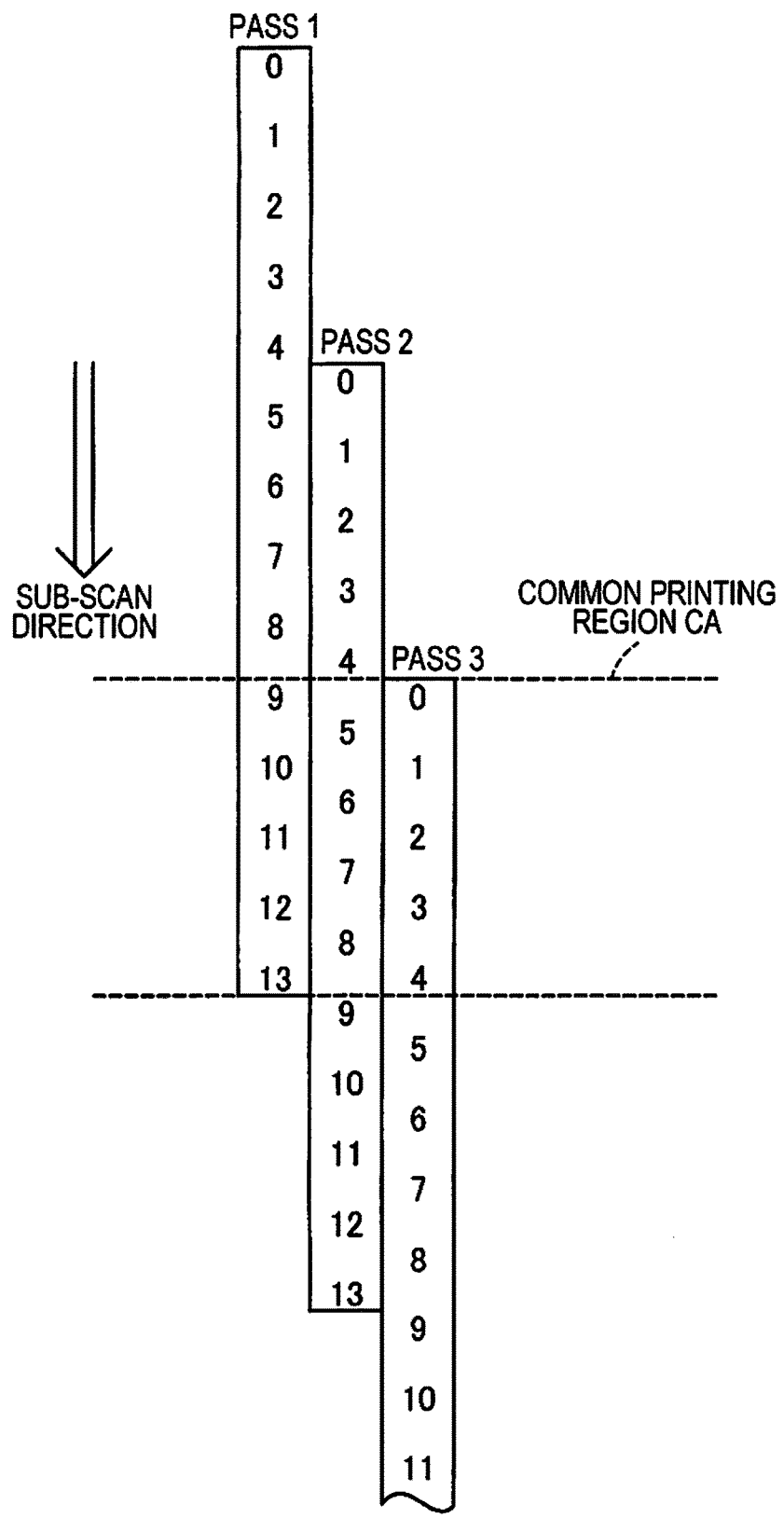
FIG. 8 is a diagram showing a state in which a nozzle string is relatively moved in a sub-scan for each pass.

FIG. 8 is a diagram showing a state in which a certain nozzle string is relatively moved in a sub-scan for each pass. FIG. 8 shows the state in which the nozzle string is moved relative to the printing medium. FIG. 8 shows the state in which the nozzle string is moved. However, if the printing medium is moved instead of the nozzle string, a direction toward which the printing medium is moved is opposite to a direction toward which the nozzle string is moved. In the first embodiment, each nozzle string including 14 nozzles (having nozzle numbers 0 to 13) is moved by a distance corresponding to 9 dots in each sub-scan (sheet feeding) for each main scan. In the first embodiment, by three main scans and two sub-scans, dots are formed in a common printing region CA and the common printing region CA is completed. The common printing region CA described in the first embodiment is a region having a width corresponding to 9 dots in the sub-scan direction. In the first embodiment, nozzles having a combination of the same nozzle numbers repeatedly appear in each cycle corresponding to 9 dots matching the sheet feeding amount in the sub-scan direction.

Since the common printing region CA is completed by the aforementioned driving and control of the print head 241, the nozzles having the nozzle numbers 9 to 13 are used for the first pass, the nozzles having the nozzle numbers 5 to 8 are used for the second pass, and the nozzles having the nozzle numbers 0 to 4 are used for the third pass in the first embodiment. Thus, since the nozzles having the nozzle numbers 9 to 13 and the nozzles having the nozzle numbers 0 to 4 scan the same pixel positions in the first pass and the third pass, printing can be executed at the same pixel positions in either the first or third pass. Thus, for example, the nozzle usage rates of the nozzles having the nozzle numbers 0 to 4 and 9 to 13 can be controlled so that the nozzle usage rates of the nozzles having the nozzle numbers 9 to 13 are set to 50% for the first pass, dots are formed by the nozzles having the nozzle numbers 9 to 13 in the first pass, the nozzle usage rates of the nozzles having the nozzle numbers 0 to 4 are set to 50% for the third pass, and dots are formed by the nozzles having the nozzle numbers 0 to 4 in the third pass. In the first embodiment, expected values of the nozzle usage rates of the multiple nozzles included in the print head 241 in the case where special consideration is not given on the side of halftones are set based on an overlapping nozzle map described below.

FIG. 9 is a diagram showing the overlapping nozzle map that is used to achieve characteristics when the ink duty shown in FIG. 5 is 100%. The overlapping nozzle map shown in FIG. 9 has a horizontal size of 2 in the main scan direction and a vertical size of 36 in the sub-scan direction. Cells shown in FIG. 9 indicates dots, respectively. Numbers indicated in the cells indicate nozzle numbers of nozzles that form the dots. Specifically, the positions of the dots to be formed on the printing medium uniquely correspond to the numbers of the nozzles that form the dots. When this overlapping nozzle map is repeatedly applied to the printing medium, pixel positions and the nozzles that forms the dots at the pixel positions can be specified. FIG. 9 shows an example of the nozzle map that indicates that a region to be scanned in the main scan direction is repeated in each cycle corresponding to 2 pixels and that assignment rates of the nozzles with the numbers 5 to 8 are 100% and assignment rates of the nozzles with the numbers 0 to 4 and 9 to 13 are 50%. If special consideration is not given on the side of halftones, the nozzles are used with the aforementioned assignment rates with a high probability, and it is possible to achieve halftones with usage rates shown in FIG. 6 and ranging between 100% and 40% in FIG. 5 as expected values. The assignment rates are values, each of which indicates the assignment rate of an overlapping nozzle indicated in the overlapping nozzle map. In order to obtain characteristics when the ink duty shown in FIG. 5 is lower than 40%, the usage rates need to be different from the assignment rates indicated in the overlapping nozzle map and a special halftone method to which special consideration is given needs to be used to cause the usage rates to be different from the assignment rates. The special halftone method is described later.

Figure 10:
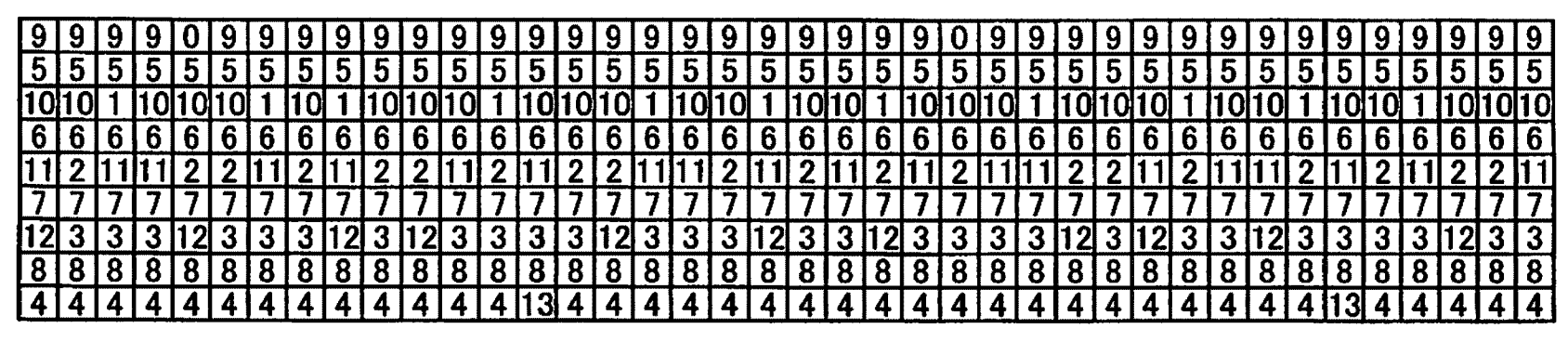

FIG. 10 is a diagram showing an overlapping nozzle map that is used to achieve the characteristics when the ink duty shown in FIG. 6 is 100%. The overlapping nozzle map shown in FIG. 10 has a horizontal size of 40 and a vertical size of 9. Characteristics obtained in the cases where the ink duty shown in FIG. 6 is in a range of 100% to 40% can be achieved with the nozzle map without special consideration with a high probability. Since the horizontal size is 40, 100/40=2.5, and the assignment rates of the nozzles can be set in units of 2.5%. Thus, this overlapping nozzle map can support characteristics obtained in the case where the assignment rates vary for the nozzles. For example, in a line that has a horizontal size of 40 and in which the nozzles with the nozzle numbers 0 and 9 overlap each other, the nozzle with the nozzle number 9 appears 38 times and the nozzle with the nozzle number 0 appears 2 times. Thus, an assignment rate of 95% of the nozzle with the nozzle number 9 and an assignment rate of 5% of the nozzle with the nozzle number 0 can be achieved. Since characteristics obtained when the ink duty shown in FIG. 6 is lower than 40% deviate from these assignment rates, the special halftone method is required to achieve the assignment rates.

The sizes of the overlapping nozzle maps may be larger than the sizes shown in FIGS. 9 and 10 or may be smaller than the sizes shown in FIGS. 9 and 10. If the horizontal sizes are increased, the assignment rates of the nozzles can be set in units of smaller percentages. In FIG. 9, the preceding nozzles and the succeeding nozzles are regularly alternately switched. If the horizontal size of the overlapping nozzle map shown in FIG. 9 is increased, the overlapping nozzle map can be set to cause the preceding nozzles and the succeeding nozzles to be irregularly switched with the same assignment rate. It is desirable that the overlapping nozzle maps be generated so that pixel positions at which dots are to be formed by a single main scan pass are treated as the same group and that pixel positions are evenly distributed and arranged without being biased in each group. In the arrangements within the nozzle maps, however, the nozzle numbers may be regularly arranged or may be irregularly arranged. In addition, the vertical sizes are not limited to the sizes shown in FIGS. 9 and 10 as long as the vertical sizes are multiples of 9 that is the sheet feeding amount. Regarding each of the vertical sizes, the same repetitive cycle of a combination of corresponding nozzle numbers is the minimum unit. In the first embodiment, the minimum unit is 9. For example, if the sheet feeding amount is not constant and is alternately switched between 7 and 11, the repetitive cycle is the sum of 7 and 11 or is 18.

The printer driver 24 controls at least any of the usage rates of the nozzles included in the preceding nozzles and the usage rates of the nozzles included in the succeeding nozzles and controls the amount of at least the light ink to be discharged onto the printing target region. In addition, if the amount of the dark ink discharged on the printing target region is larger than the predetermined amount, the printer driver 24 causes the print head 241 to discharge a smaller amount of the light ink than the amount of the discharged dark ink onto the printing target region from the multiple nozzles so that the amount of the light ink discharged from the succeeding nozzles is larger than the amount of the light ink discharged from the preceding nozzles. Hereinafter, a printing process is described in detail.

Figure 11:
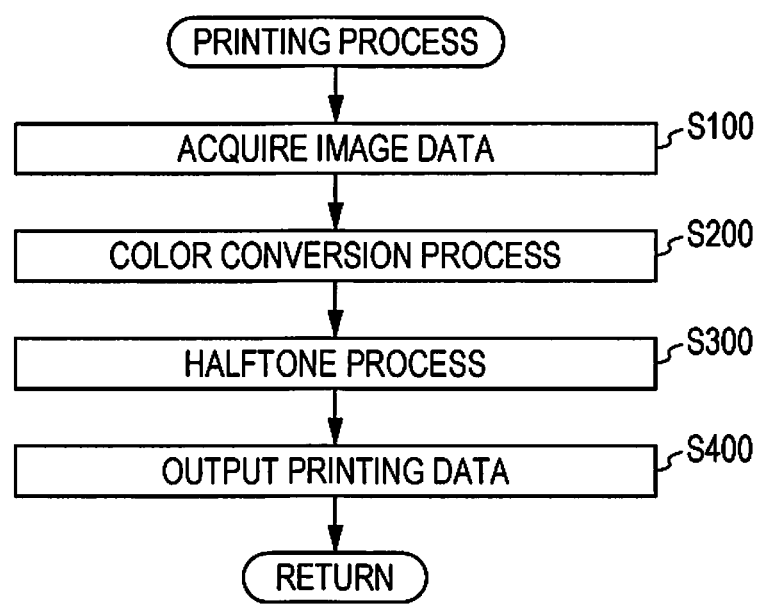
FIG. 11 is a flowchart of a printing process to be executed by a computer.

FIG. 11 is a flowchart of the printing process to be executed by the computer 100 according to the first embodiment. The printing process is executed by causing the CPU 102 as hardware to execute a program prepared as the printer driver 24. The program may be stored in a memory of the computer 100 or may be recorded in various recording media from which the computer 100 can read the program. In the printing process, the computer 100 uses the image acquisition module 40 to acquire image data IMG in RGB format or monochrome format from the application program 20 (in step S100). Step S100 is also referred to as "acquisition process".

When acquiring the image data, the computer 100 uses the color conversion module 42 to execute a color conversion process of converting the image data, acquired in step S100, in RGB format to image data in CMYKLcLmLk format or converting the image data, acquired in step S100, in monochrome format to image data in KLk format and determines image data (ink duty) of each color (in step S200). If the input image data is in RGB format, the computer 100 references a three-dimensional lookup table for receiving RGB values and outputting ink duties of the ink of the colors and determines the ink duties, corresponding to the input image data, of the cyan, magenta, yellow, black, light cyan, light magenta, and gray ink. If the input image data is in monochrome format, the computer 100 uses a table indicating the relationships (shown in FIG. 4) between the input gradation value and the ink duties, and determines the ink duties of the dark and light ink. In FIG. 4, if the amount of the dark ink is larger than the predetermined amount, characteristics in which a smaller amount of the light ink than the amount of the dark ink is used together with the dark ink can be achieved.

If the input image data is in RGB format, and the amount of the dark ink is larger than the predetermined amount, ink amounts to be output from the three-dimensional lookup table are set so that an appropriate amount of the light ink that is smaller than the amount of the dark ink is used together with the dark ink simultaneously. If the input image data is in RGB format, the cyan ink and the light cyan ink are dark and light ink having the same color phase, the magenta ink and the light magenta ink are dark and light ink having the same color phase, and the black ink and the gray ink are dark and light ink having the same color phase. The invention may be applied to all the three combinations or may be applied to only one of the three combinations. In general, gloss unevenness of the black (K) ink is most noticeable. Thus, the first embodiment is applied to only the combination of the black ink and the gray ink, but may be applied to the other combinations in the same manner. Upon the reference of the three-dimensional lookup table, the following method may be used: a method of executing tetrahedral interpolation based on four neighboring grid points for ink amounts to be output and corresponding to RGB values between grid points on the basis of a lookup table corresponding to only RGB values on grid points appropriately separated from each other, instead of using a lookup table corresponding to all combinations of RGB values. In addition, if the input image data is in RGB format, the three-dimensional lookup table is referenced and a single-dimensional lookup table shown in FIG. 4 is not used. When output ink amounts corresponding to RGB values equal to each other on a monochrome axis are extracted from the three-dimensional lookup table, graphs equivalent with those shown in FIG. 4 can be obtained. In this case, since the logic of light and dark tones is reversed, the left end of the abscissa indicates that R=G=B=255, and the right end of the abscissa indicates that R=G=B=0. FIG. 4 shows only the black ink and the gray ink. However, even if the input data is monochrome data, appropriate amounts of chromatic color ink other than the black and gray ink may be added to improve granularity upon low densities and adjust gray balance.

When the image data in CMYKLcLmLk format or KLk format is obtained, the computer 100 uses the halftone module 44 to execute the halftone process using the dither mask DM for each of cyan (C), magenta (M), yellow (Y), black (K), light cyan (Lc), light magenta (Lm), and gray (Lk) colors in the case of the input image data in RGB format or for each of black (K) and gray (Lk) colors in the case of the input image data in monochrome format (in step S300). In the first embodiment, in order to achieve the aforementioned special halftone method, the dither mask DM with a threshold arrangement optimized in synchronization with the overlapping nozzle map shown in FIG. 9 is used to simultaneously execute the halftone process and the determination of the usage rates of the nozzles. Specifically, if the ink duty is equal to or lower than 40%, horizontal and vertical sizes of the dither mask DM are set to be equal to integral multiples of the horizontal and vertical sizes of the overlapping nozzle map, and nozzle numbers corresponding to positions on the dither mask DM are uniquely determined. Then, the overlapping nozzle map shown in FIG. 9 is referenced and the dither mask DM is generated in advance so that the rate at which small thresholds for causing dots to be easily formed are arranged at the positions of the nozzle numbers of the succeeding nozzles is high. Thus, the characteristics obtained in the cases where the ink duty shown in FIG. 5 is 16% and 5% are achieved. A method of setting thresholds of the dither mask is described in Japanese Patent No. 5633110, for example. In the first embodiment, the halftone module 44 uses the dither mask DM to execute the halftone process with an ordered dither method, but may execute the halftone process with another method such as an error diffusion method.

When the halftone process is terminated, the computer 100 uses the printing data output module 46 to output, as printing data, the image data, subjected to the halftone process, of the cyan, magenta, yellow, black, light cyan, light magenta, and gray colors to the printer 200 (in step S400). In this case, the computer 100 references the overlapping nozzle map and causes data specifying nozzles for forming dots at pixel positions to be included in the printing data. Step S400 is also referred to as "dot formation process".

The printer 200 receives the printing data, drives the print head 241 while treating the nozzle pitch as "2" and the sheet feeding amount as "9" as described above, and causes the nozzles specified in the printing data to discharge the ink of the colors upon forward and backward movements of the print head 241, thereby executing bidirectional printing.

In the aforementioned printing process, not only the dark ink but also a small amount of the light ink are discharged to print a black color with a high density. In this case, if the same position of a printed region on the printing medium is paid attention, the light ink has been discharged mainly by succeeding nozzles. Thus, when a dark color is output using the dark ink containing a small amount of the resin composition, the light ink containing a large amount of the resin composition can remain on the surface of the printing medium. It is, therefore, possible to suppress the diffused reflection of light and suppress the occurrence of gloss unevenness. Especially, since the serial printer executes the bidirectional printing in the first embodiment, an effect that is referred to as "gloss banding" in which gloss unevenness is recognized in each band may easily occur. In the first embodiment, however, since the diffused reflection of light can be suppressed as described above, the occurrence of the gloss banding can be suppressed.

In the first embodiment, when the special halftone method is used, thresholds corresponding to positions at which dots are formed by the succeeding nozzles for discharging the light ink are set to values that cause dots to be more easily formed than thresholds corresponding to positions at which dots are formed by the preceding nozzles among multiple nozzles for discharging the light ink in the dither mask DM, and the halftone process and the determination of the usage rates of the nozzles can be simultaneously executed by only using the dither mask DM. Thus, the speed of the process can be increased.

B. Second Embodiment

In the aforementioned first embodiment, the overlapping nozzle map is used to set the usage rates of the nozzles. On the other hand, in a second embodiment, an overlapping nozzle map is not used and the usage rates of the nozzles are set in units of pixels with a high probability. For example, FIG. 5 shows the nozzle usage rates of the nozzles with the nozzle numbers in the cases where the ink duty is 100%, 40%, 16%, and 5%. The nozzle usage rates of the nozzles when the ink duty is another value not shown in FIG. 5 may be determined in the same manner as described above. Alternatively, if a method of executing the linear interpolation for each nozzle number based on the characteristics of the determined values of the ink duty to calculate characteristics of values between the determined values is defined, the nozzle usage rates of the nozzles with the nozzle numbers when the ink duty is an arbitrary value can be determined.

For example, an expected value of a nozzle usage rate of a nozzle number (nw) that corresponds to an input gradation value (Input Duty(x,y)) of a pixel position (x,y) is obtained as a function of the input gradation value and the nozzle number according to Formula (1).

$$\text{Nozzle On Duty}(\text{Input Duty}(x,y), nw) \qquad (1)$$

For example, in the case where dots are formed as shown in FIG. 8, if a pixel position in the sub-scan direction that corresponds to the nozzle number 0 shown on the upper left side in FIG. 8 is indicated by y=1, nozzle numbers $nw1(y)$ and $nw2(y)$ of two nozzles capable of forming dots at an arbitrary pixel position y in the sub-scan direction are obtained according to Equations (2) and (3), where "%" indicates an operator for calculating a remainder.

If y is an even number, $$nw1(y)=(y/2+4)\%9, \text{ and } nw2(y)=nw1(y)+9 \qquad (2)$$

If y is an odd number, $$nw1(y)=((y-1)/2)\%9, \text{ and } nw2(y)=nw1(y)+9 \qquad (3)$$

In this case, since the total of the usage rates of the overlapping two nozzles is equal to an input gradation value of the pixel position, the following Equation (4) is established.

$$\text{Input Duty}(x,y)=\text{Nozzle On Duty}(\text{Input Duty}(x,y), nw1(y))+\text{Nozzle On Duty}(\text{Input Duty}(x,y),nw2(y)) \qquad (4)$$

In the second embodiment, a process of binarizing input gradation values of pixel positions is executed by a general halftone process such as an error diffusion method or a dither method. Whether the overlapping nozzle $nw1(y)$ or the overlapping nozzle $nw2(y)$ is used to discharge ink at pixel positions may be determined according to Formulas (5) and (6) by generating a real random number (rand( ) in a range of 0 to 1 for each of the pixel positions, for example.

$$\text{If rand( )<Nozzle On Duty(Input Duty}(x,y),nw1(y))/\text{Input Duty}(x,y), nw1 \text{ is used} \qquad (5)$$

$$\text{If rand( )Nozzle On Duty(Input Duty}(x,y),nw1(y))/\text{Input Duty}(x,y), nw2 \text{ is used} \qquad (6)$$

According to the second embodiment, the characteristics shown in FIG. 5 can be achieved for the nozzle usage rates of the nozzles with the nozzle numbers without the use of an overlapping nozzle map.

C. Modified Examples

First Modified Example

In the aforementioned embodiments, the pigments are used as the color materials of the ink, but dyes may be used as the color materials of the ink.

Second Modified Example

In the aforementioned embodiments, the printing is executed in the printing system 10 including the computer 100 and the printer 200. On the other hand, the printer 200 may receive the image data from the digital camera or various memory cards and execute the printing. Specifically, the CPU 102 included in the control circuit 260 of the printer 200 may execute the printing by executing processes equivalent with the aforementioned printing process and the halftone process.

Third Modified Example

In the aforementioned embodiments, only when the input gradation value of the dark ink is equal to the maximum value or is a value (for example, 95% of the maximum input gradation value or greater) close to the maximum value, the light ink may be discharged from the succeeding nozzles.

Fourth Modified Example

In the aforementioned embodiments, the printing may be executed with the ink other than the light ink while usage rates of nozzles for discharging the ink other than the light ink are nozzle usage rates shown in FIG. 5 or 6, or the printing may be executed while the nozzles evenly discharge the ink. In addition, usage rates of nozzles located at central portions of the nozzle strings may be increased regardless of the ink duty, and the printing may be executed.

Fifth Modified Example

In the aforementioned embodiments, the number of overlapping nozzles, the nozzle pitches, the sheet feeding amount, and a printing mode (bidirectional printing mode) are an example, and these parameters may be set to arbitrary values. For example, the printing mode may be a unidirectional printing mode in which the ink is discharged only upon a forward or backward movement of the print head.

The invention is not limited to the aforementioned embodiments and the modified examples and may be achieved by various configurations without departing from the gist of the invention. For example, the technical characteristics described in the embodiments and the modified examples and corresponding to the technical characteristics according to the aspects described in SUMMARY may be replaced or combined in order to solve the aforementioned problems or achieve a part or all of the aforementioned effects as necessary. In addition, if at least any of the technical characteristics is not described as a necessary characteristic in the present specification, the technical characteristic may be removed as necessary.

This application claims priority under 35 U.S.C. § 119 to Japanese Patent Application No. 2016-181208, filed Sep. 16 2016. The entire disclosure of Japanese Patent Application No. 2016-181208 is hereby incorporated herein by reference.

What is claimed is:

1. A printing apparatus comprising:
    a print head that has a plurality of nozzles capable of discharging dark ink and light ink that are of the same color type and is driven relative to a printing medium in a main scan direction that is a width direction of the printing medium and in a sub-scan direction intersecting the main scan direction;
    an acquiring section that acquires image data; and
    a dot forming section that forms dots based on the image data on the printing medium by causing the print head to discharge the ink onto the printing medium while causing the print head to scan a common printing region in the main scan direction multiple times,
    wherein the plurality of nozzles includes preceding nozzles that discharge the ink onto the printing medium before the ink discharge of the other nozzles, and succeeding nozzles that discharge the ink onto the printing medium after the ink discharge of the preceding nozzles,
    wherein the dot forming section controls a usage rate of at least any of nozzles included in the preceding nozzles and nozzles included in the succeeding nozzles and controls the amount of at least the light ink to be discharged onto a printing target region in a preceding pass in which a scan is executed in the main scan direction while dots are formed using the preceding nozzles and a succeeding pass in which a scan is executed in the main scan direction while dots are formed using the succeeding nozzles, and
    wherein, if the amount of the dark ink discharged on the printing target region is larger than a predetermined amount, the dot forming section causes the print head to discharge a smaller amount of the light ink than the amount of the discharged dark ink onto the printing target region from the plurality of nozzles so that the amount of the light ink discharged from the succeeding nozzles is larger than the amount of the light ink discharged from the preceding nozzles.

2. The printing apparatus according to claim 1,
wherein the dot forming section determines the formation of dots by comparing a plurality of thresholds included in a dither mask with pixel data forming the image data, and
wherein, in the dither mask, thresholds corresponding to positions at which dots are formed by the succeeding nozzles that discharge the light ink are set to values that cause dots to be more easily formed than thresholds corresponding to positions at which dots are formed by the succeeding nozzles that discharge the light ink and are among the plurality of nozzles.

3. A printing method for relatively driving a print head having a plurality of nozzles capable of discharging dark ink and light ink that are of the same color type with respect to a printing medium in a main scan direction that is a width direction of the printing medium and in a sub-scan direction intersecting the main scan direction and executing printing, comprising:
    an acquisition process of acquiring image data; and
    a dot formation process of forming dots based on the image data on the printing medium by causing the print head to discharge the ink onto the printing medium while causing the print head to scan a common printing region in the main scan direction multiple times,
    wherein the plurality of nozzles includes preceding nozzles that discharge the ink onto the printing medium before the ink discharge of the other nozzles, and succeeding nozzles that discharge the ink onto the printing medium after the ink discharge of the preceding nozzles,
    wherein, in the dot formation process, a usage rate of at least any of nozzles included in the preceding nozzles and nozzles included in the succeeding nozzles is controlled and the amount of at least the light ink to be discharged onto a printing target region is controlled in a preceding pass in which a scan is executed in the main scan direction while dots are formed using the preceding nozzles and a succeeding pass in which a scan is executed in the main scan direction while dots are formed using the succeeding nozzles, and
    wherein, if the amount of the dark ink discharged on the printing target region is larger than a predetermined amount, a smaller amount of the light ink than the amount of the discharged dark ink is discharged onto the printing target region from the plurality of nozzles so that the amount of the light ink discharged from the succeeding nozzles is larger than the amount of the light ink discharged from the preceding nozzles.

4. A non-transitory computer readable medium for storing program for causing a printing apparatus to relatively drive a print head having a plurality of nozzles capable of discharging dark ink and light ink that are of the same color type with respect to a printing medium in a main scan direction that is a width direction of the printing medium and in a sub-scan direction intersecting the main scan direction and execute printing, comprising:
    an acquisition function of acquiring image data; and
    a dot formation function of forming dots based on the image data on the printing medium by causing the print head to discharge the ink onto the printing medium while causing the print head to scan a common printing region in the main scan direction multiple times,
    wherein the plurality of nozzles includes preceding nozzles that discharge the ink onto the printing medium before the ink discharge of the other nozzles, and succeeding nozzles that discharge the ink onto the printing medium after the ink discharge of the preceding nozzles,
    wherein the dot formation function controls a usage rate of at least any of nozzles included in the preceding nozzles and nozzles included in the succeeding nozzles and controls the amount of at least the light ink to be discharged onto a printing target region in a preceding pass in which a scan is executed in the main scan direction while dots are formed using the preceding nozzles and a succeeding pass in which a scan is executed in the main scan direction while dots are formed using the succeeding nozzles, and
    wherein, if the amount of the dark ink discharged on the printing target region is larger than a predetermined amount, the dot formation function causes the print head to discharge a smaller amount of the light ink than the amount of the discharged dark ink onto the printing target region from the plurality of nozzles so that the amount of the light ink discharged from the succeeding nozzles is larger than the amount of the light ink discharged from the preceding nozzles.

* * * * *